United States Patent
De Mers et al.

(10) Patent No.: US 9,769,438 B2
(45) Date of Patent: Sep. 19, 2017

(54) HYBRID PROJECTION/OLED DISPLAY

(71) Applicant: HONEYWELL INTERNATIONAL INC., Morristown, NJ (US)

(72) Inventors: Robert E De Mers, Nowthen, MN (US); L S Lamberth, Jr., Scottsdale, AZ (US); Brent D. Larson, Phoenix, AZ (US); Kalluri R. Sarma, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 70 days.

(21) Appl. No.: 14/842,435

(22) Filed: Sep. 1, 2015

(65) Prior Publication Data

US 2017/0064267 A1 Mar. 2, 2017

(51) Int. Cl.
| | |
|---|---|
| *G09G 3/3208* | (2016.01) |
| *H04N 9/31* | (2006.01) |
| *G09G 3/20* | (2006.01) |
| *G09G 5/42* | (2006.01) |
| *G09G 3/00* | (2006.01) |
| *G09G 3/3233* | (2016.01) |

(52) U.S. Cl.
CPC ........ *H04N 9/3147* (2013.01); *G09G 3/002* (2013.01); *G09G 3/2003* (2013.01); *G09G 3/3208* (2013.01); *G09G 3/3233* (2013.01); *G09G 5/42* (2013.01); *G09G 2300/0842* (2013.01); *G09G 2360/142* (2013.01); *G09G 2380/12* (2013.01)

(58) Field of Classification Search
CPC combination set(s) only.
See application file for complete search history.

(56) References Cited

U.S. PATENT DOCUMENTS

| | | | |
|---|---|---|---|
| 7,348,946 B2 | 3/2008 | Booth, Jr. et al. | |
| 7,545,350 B2 | 6/2009 | Nakamura et al. | |
| 8,810,483 B1 | 8/2014 | Fan | |
| 2003/0025458 A1 | 2/2003 | Tuli | |
| 2003/0193485 A1* | 10/2003 | da Cunha | G09G 3/002 345/204 |
| 2003/0201956 A1 | 10/2003 | Anderson et al. | |
| 2006/0038751 A1 | 2/2006 | Johnson et al. | |

OTHER PUBLICATIONS

EP Communication for Application No. 16185791.7-1904 dated Nov. 21, 2016.
Olive G., et al. "The use of photoconductive CdS: Cu, Ci thin films in a laser-addressed electroluminescent display screen," Techwest Enterprises Ltd, Thin Solid Films vol. 41, Issue 2, pp. 151-160, Mar. 1, 1977.
Extended EP Search Report for Application No. 16185791.7-1914 dated Jan. 25, 2017.

* cited by examiner

*Primary Examiner* — Robin Mishler
(74) *Attorney, Agent, or Firm* — Lorenz & Kopf, LLP (57) ABSTRACT

A hybrid projection display system that provides image quality superior to that of a traditional projection display system is provided. The provided hybrid projection display system flexibly supports arbitrary screen sizes and non-planar screen surfaces.

17 Claims, 5 Drawing Sheets

HYBRID PROJECTION/OLED DISPLAY

TECHNICAL FIELD

Embodiments of the subject matter described herein relate generally to display systems and, more particularly, to a hybrid projection display system that provides image quality superior to that of a traditional projection display system while flexibly supporting arbitrary screen sizes and non-planar screen surfaces.

BACKGROUND

Display system customers, especially customers for aircraft display systems, frequently desire display systems with screens that have irregular sizes and shapes, while still providing the biggest possible screen. In some cases, rear projection display systems have been used to satisfy the demand for screens with irregular sizes and shapes. Unlike direct view display systems, rear projection display systems typically have an entirely passive diffuser screen, upon which the image is viewed, and due to being passive, it can be made in any shape. Additionally, rear projection displays may use multiple image sources or projectors to create one big display image across an entire flight deck. However, rear projection displays often do not meet optical performance requirements of aircraft display systems.

Some current active display screens, such as those in traditional direct view display systems, comprise display elements, such as liquid crystal displays (LCDs) and organic light emitting diodes (OLEDs) that meet the optical performance requirements of aircraft display systems. However, current active display screens are generally confined to rectangular shapes in order to accommodate the power and electronic control signals required by each display elements. Attempts to generate a LCD or an OLED with a non-rectangular shape have so far been economically unfeasible for many applications, especially those requiring low to moderate quantities of displays.

Accordingly, a hybrid projection display system that provides image quality superior to that of a traditional projection display system while flexibly supporting arbitrary screen sizes and non-planar screen surfaces as in a rear projection display system is desired. The present invention provides the desired features.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A display system is provided. The display system comprises:

a controller configured to receive an image signal and generate image data and screen controls therefrom, the screen controls comprising a source voltage (Vs), a first gate voltage (VG1), a second gate voltage (VG2), a power supply (Vdd), and a ground (GND);

an image source coupled to the controller and configured to (i) receive the image data (ii) generate an optical signal therefrom, and (iii) project the optical signal; and a screen assembly (i) coupled to the controller, (ii) configured to receive the screen controls, and (iii) oriented to receive the optical signal, the screen assembly comprising a first display element that activates in response to receiving the optical signal, wherein the first display element comprises:

a first transistor (T1) comprising a gate, a drain and a source;

a second transistor (T2) comprising a gate, a drain and a source;

a third transistor (T3) comprising a gate, a drain, and a source;

a diode comprising a first terminal and a second terminal;

a resistor comprising a first terminal and a second terminal;

a capacitor comprising a first terminal and a second terminal; and wherein the gate of T2 is coupled to VG1, the drain of T2 is coupled to the gate of T3 and to the first terminal of the capacitor, and the source of T2 is coupled to the drain of T1;

wherein the gate of T1 is coupled to VG2, the source of T1 is coupled to Vs, and the drain of T1 is coupled to the first terminal of the resistor;

wherein the drain of T3 is coupled to Vdd, and the source of T3 is coupled to the first terminal of the diode; and wherein the second terminal of the resistor, the second terminal of the capacitor, and the second terminal of the diode are each coupled to GND.

Another display system is provided. The display system comprises:

a controller configured to receive an image signal and generate image data and screen controls therefrom;

an image source coupled to the controller and configured to (i) receive the image data (ii) generate an optical signal comprising red pixel data, blue pixel data, and green pixel data therefrom, and (iii) project the optical signal; and a screen assembly having a plurality of edges, the screen assembly (i) coupled to the controller, (ii) configured to receive the screen controls along one edge of the plurality of edges, and (iii) oriented to receive the optical signal; and wherein the screen assembly comprises a plurality of display elements, and each display element of the plurality of display elements is one of the set comprising: red display element, blue display element, and green display element.

Yet another display system is provided, the display system comprises:

a controller configured to receive an image signal and generate image data and screen controls therefrom, the screen controls comprising a red color select line, a blue color select line, and a green color select line;

an image source coupled to the controller and configured to (i) receive the image data, (ii) generate therefrom an optical signal comprising red pixel data, blue pixel data, and green pixel data, and (iii) project the optical signal; and a screen assembly having a plurality of edges, the screen assembly (i) coupled to the controller, (ii) configured to receive the screen controls along one edge of the plurality of edges, and (iii) oriented to receive the optical signal;

wherein the screen assembly comprises a plurality of display elements arranged in a pixel matrix, and each display element of the plurality of display elements is one of the set comprising: red display element coupled to the red color select line; blue display element coupled to the blue color select line; and green display element coupled to the green color select line.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to known graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices, such as controller 104. Such operations, tasks, and functions are sometimes referred to as being processor-executed, computer-executed, computerized, software-implemented, or computer-implemented. In practice, controller 104 may be implemented as one or more processor devices configured to carry out the described operations, tasks, and functions by manipulating electrical signals representing data bits at memory locations in the processor electronics of the display system, as well as other processing of signals. The memory locations where data bits are maintained in the processor electronics are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, and consistent with the discussion hereinabove, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiments described herein are merely examples and serve as guides for implementing the novel systems and methods on any window in any avionics, astronautics, terrestrial, or water application. As used herein, an "optical signal" includes one to a plurality of wavelengths of light in a predetermined pattern. The optical signal may represent any combination of symbology, alphanumeric information, video, and/or figures. The examples presented herein are intended as non-limiting.

Figure 1:
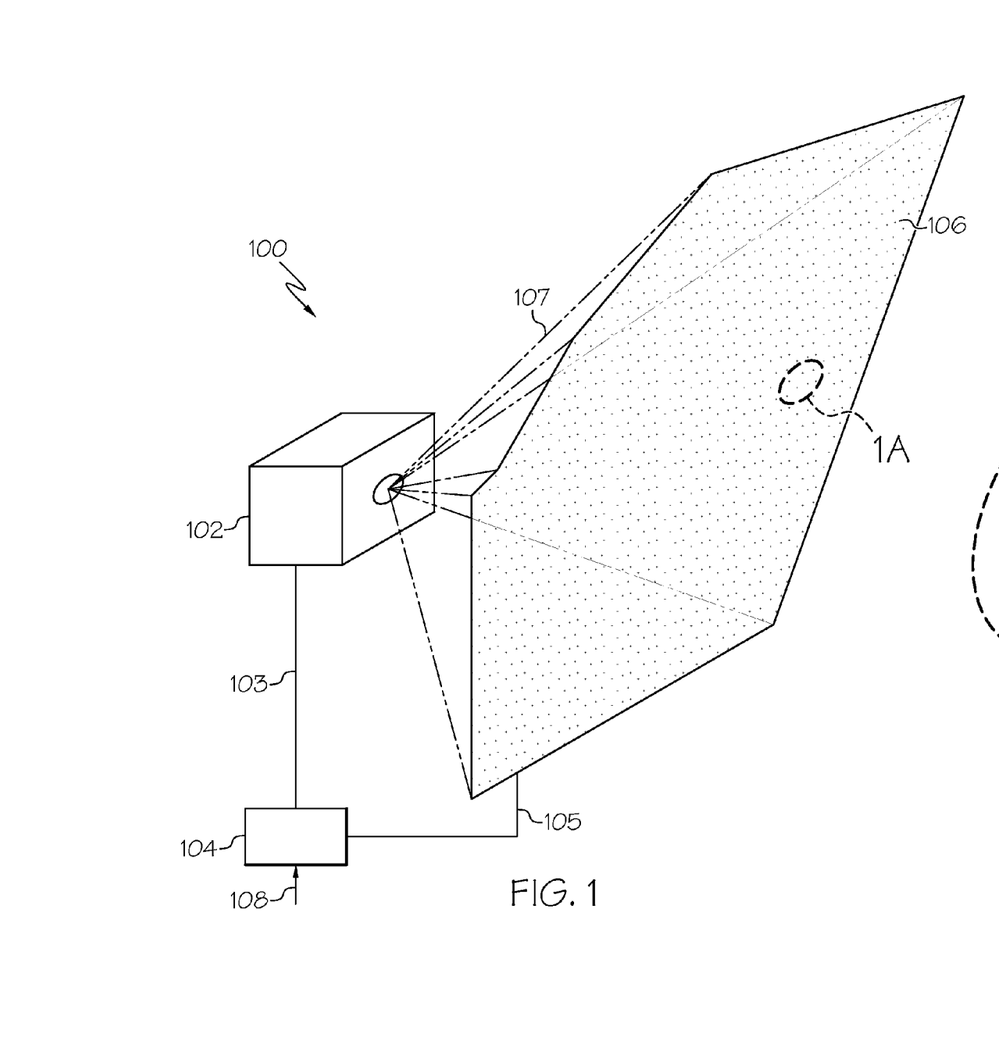
FIG. 1 is a simplified diagram of a display system according to an exemplary embodiment.

FIG. 1 is a simplified diagram of a display system 100 according to an exemplary embodiment. Controller 104 is coupled to, and is in active communication with, image source 102 and screen assembly 106. An image signal 108 may come from a Video Graphics Array (VGA), a Digital Video Interface (DVI), or any similar source of image information. Controller 104 receives the image signal 108, processes it, and generates image data 103 and screen controls 105 therefrom.

The image source 102 is configured to receive the image data 103. In response to receipt of the image data 103, the image source 102 generates optical signal 107 therefrom. The optical signal 107 comprises "pixel data," configured in a pixel matrix. The optical signal 107 is generally one or more distinct wavelength bands of light representing a dynamic or static image. The image source 102 may be a projector, a scanned laser source, or any similar device capable of projecting the pixel data herein referred to as the optical signal 107.

The image source 102 may be under electronic and/or mechanical control and may employ various methods for projecting individual frames of an image. Accordingly, the image source 102 may be responsible for creating a pixel matrix associated with an image, may be adjusted to have a brightness that maintains display visibility in the presence of sunlight or other ambient light, and may employ various synchronizing techniques. In an embodiment, the image source 102 operates in both frame sequential and color sequential mode.

Figure 1A:
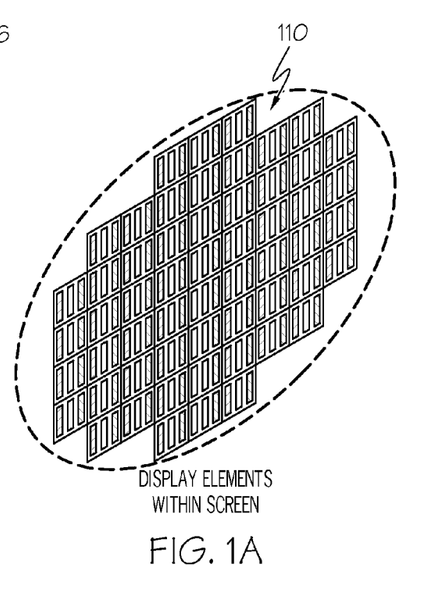
FIG. 1A is an expanded diagram of a portion of FIG. 1, showing the display elements within the screen assembly.

Screen assembly 106 is coupled to controller 104, from which it receives screen controls 105. Screen assembly 106 is also oriented to receive the optical signal 107. The screen assembly 106 comprises a plurality 110 of display elements (FIG. 1A and FIG. 3 300) wherein the plurality 110 of display elements (FIG. 1A and FIG. 3 300) is arranged within the screen assembly 106 in repeating groups (FIG. 4, 414), described in more detail in connection with FIG. 4. The operation of each of the display elements (FIG. 3 300) is based on synchronized interaction between the screen controls 105 and the optical signal 107 (synchronized timing is described in more detail in connection with FIG. 5). Various embodiments of screen assembly 106 may be employed, and screen assembly 106 may be substantially planar, have curvature, and/or have a border that is irregular or non-rectangular.

Figure 2:
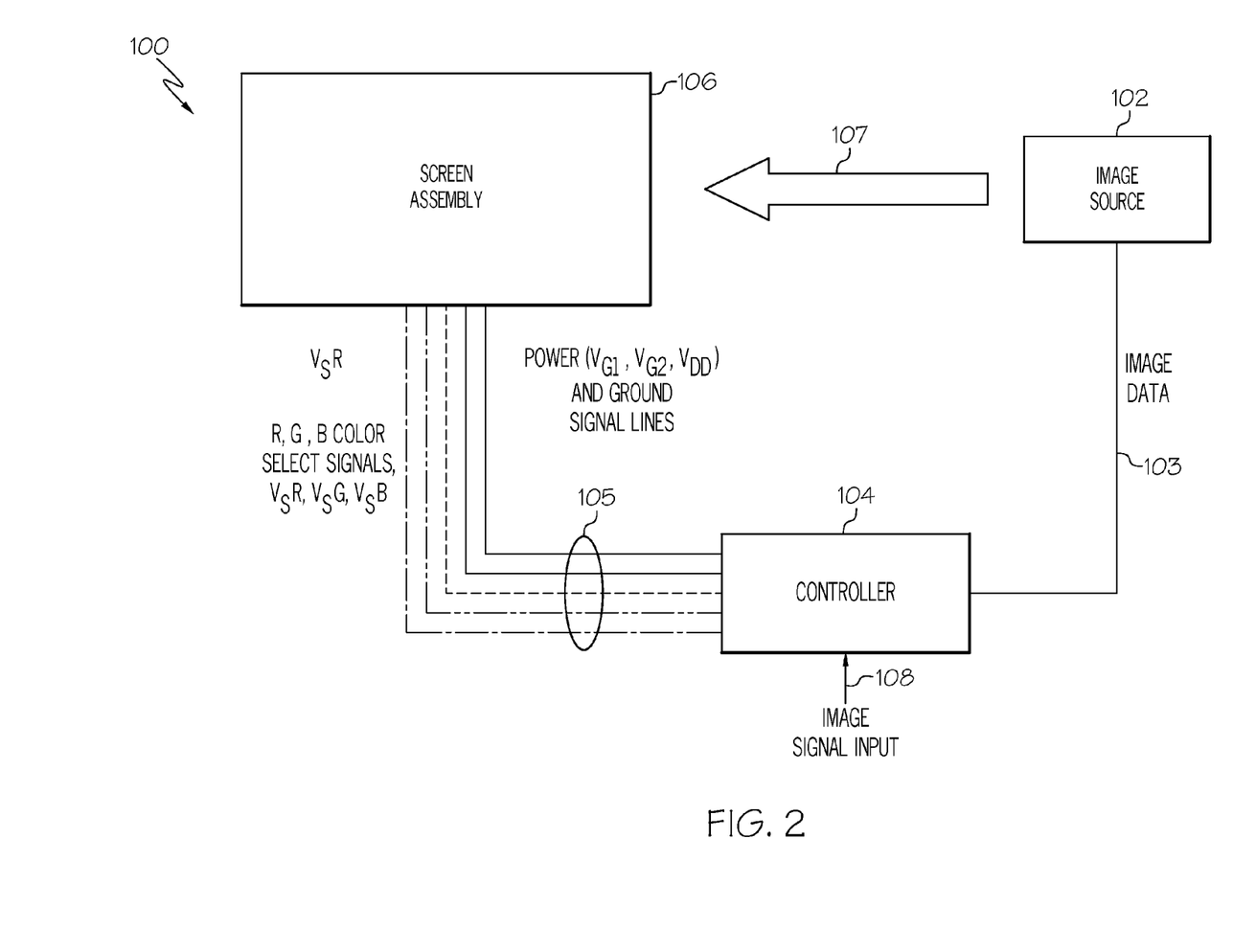
FIG. 2 is a block diagram of FIG. 1, providing additional detail, in accordance with an exemplary embodiment.

FIG. 2 is a block diagram of FIG. 1, providing additional detail, in accordance with an exemplary embodiment. Screen controls 105 from the controller 104 comprise a source voltage (Vs), a first gate voltage (VG1), a second gate voltage (VG2), a power supply (Vdd), and a ground (GND). In various embodiments, each of these screen control voltages can serve as color select signals, either alone or in combination. As an exemplary embodiment, FIG. 2 depicts the use of multiple Vs lines as color select signals for red, green and blue image content (R, G, B). As mentioned above, the operation of each of the display elements (FIG. 3 300) comprising the screen assembly 106 is based on synchronized interaction between the various screen controls 105 and the optical signal 107. In the following figure, the features of a display element are shown, including couplings to the relevant screen controls 105. The synchronized timing for an exemplary embodiment is described in connection with FIG. 5.

Figure 3:
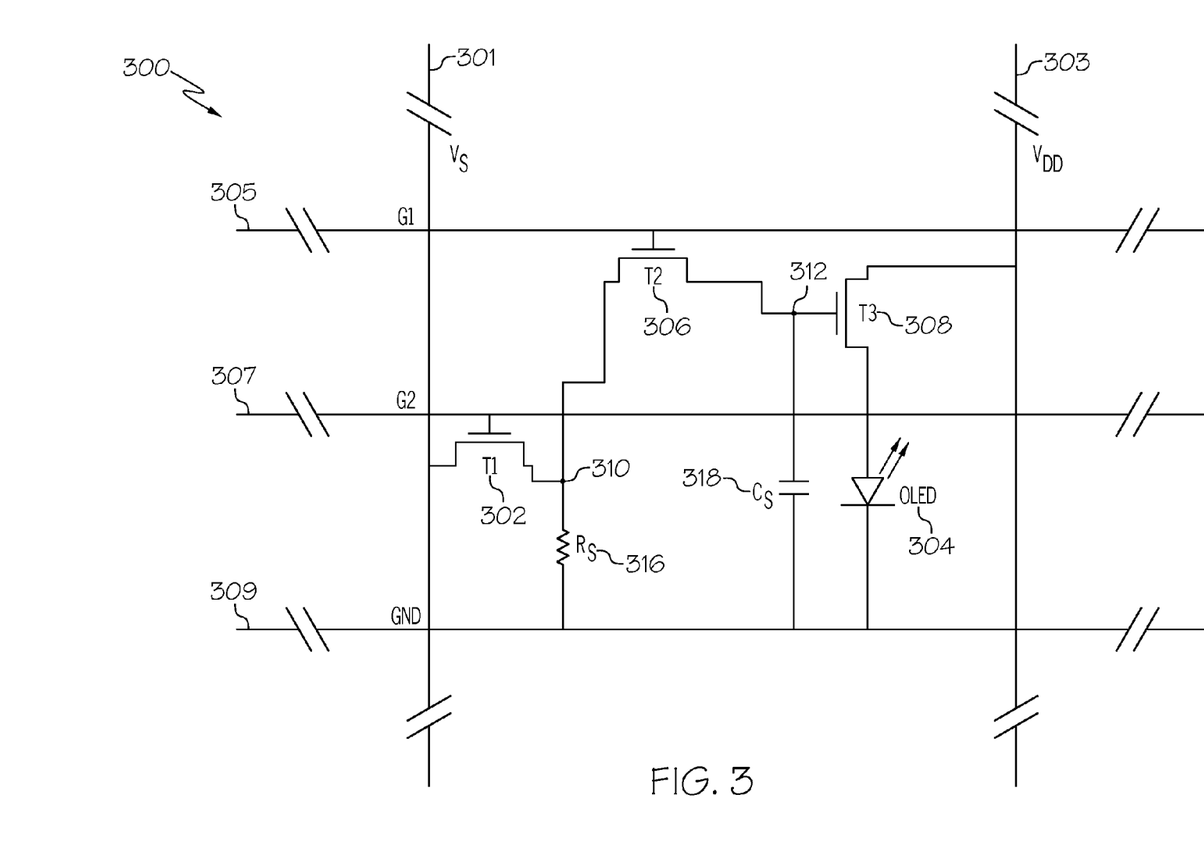
FIG. 3 is a schematic diagram of a display element, in accordance with an exemplary embodiment.
Figure 4:
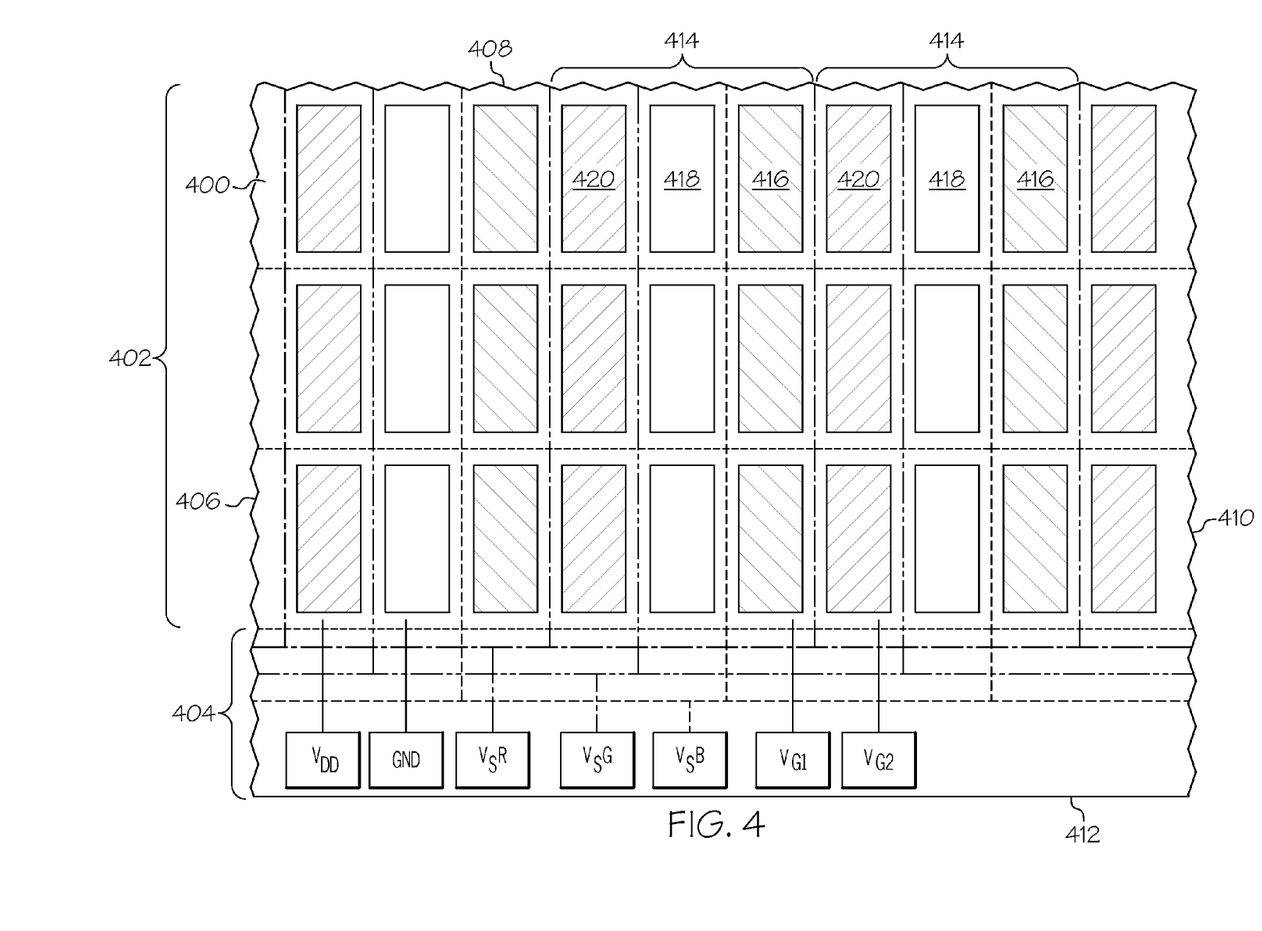
FIG. 4 is an illustration showing an arrangement of display elements and associated screen controls, in accordance with an exemplary embodiment.

FIG. 3 is a schematic diagram of a display element 300, in accordance with an exemplary embodiment. A person with skill in the art will recognize that the display element 300 may be referred to as a "pixel" or a "pixel element." In the exemplary embodiment, a plurality 110 of display elements 300 is arranged within the screen assembly 106 in repeating groups (FIG. 4, 414).

The signals comprising the screen controls 105 are shown: source voltage (Vs) 301, first gate voltage (VG1) 305, second gate voltage (VG2) 307, power supply (Vdd) 303, and ground (GND) 309. In the exemplary embodiment, the various components of display element 300 are configured as follows. A first transistor T1 302 has VG2 307 coupled to its gate, has Vs 301 coupled to its source, and a drain coupled to node 310; wherein node 310 is coupled to GND 309 via resistor Rs 316. In the exemplary embodiment, T1 302 is a photo transistor, sensitive to at least one component of the optical signal 107. A second transistor T2 306 has VG1 305 coupled to its gate, node 312 coupled to its drain and a source coupled to node 310. Node 312 is additionally coupled to a first terminal of a capacitor Cs 318, and the gate of a third transistor T3 308. Third transistor T3 308 has a drain coupled to the power supply Vdd 303 and a source coupled to a first terminal of a diode 304. A second terminal of capacitor Cs 318 and second terminal of diode 304 are each coupled to GND 309. One embodiment of display element 300 may vary from another embodiment of display element 300 in the characteristics of T1 302 and diode 304, as will be described in more detail hereinbelow.

In operation, when the optical signal 107 impinges on, or is received by, screen assembly 106, one or more display elements 300 are "activated." As used herein, "activation" of a display element 300 means: in response to receiving the optical signal 107, a respective enabled (photo) transistor T1 302 is activated, enabling a pixel transistor T2 306 to enable a drive transistor T3 308, which in turn drives OLED diode 304 to emit a wavelength band of light to a pixel luminance requirement. Therefore, when the display element 300 is activated by the optical signal 107, with appropriate voltages on VG1, VG2, and Vs, capacitor Cs 318 and the gate of T3 308 are charged to a voltage sufficient to drive a desired current through OLED diode 304 from the power supply VDD 303. The desired current for OLED diode 304 to emit a desired light output level may correspond to a pixel luminance requirement.

In practice, sizes and characteristics of the various components of display element 300 may vary to assure activation of the display elements 300 as required according to an intended application. In an embodiment, T1 302 is a photo transistor built in amorphous-silicon technology, in order to be sensitive to visible and near infra-red light, and T2 306 and T3 308 are conventional thin film transistors. Diode 304 may be an organic light emitting diode (OLED) built using a top-emission architecture to achieve high pixel aperture ratio. Diode 304 may also be fabricated using a bottom emission architecture particularly for low resolution displays where maintaining a high pixel aperture ratio is not a big issue. In another embodiment, diode 304 may be fabricated via a shadow mask (vacuum) evaporation process, or via inkjet printing. In an embodiment, gate select voltage VG1 305 may require approximately fifteen volts to enable and approximately minus five volts to disable; gate select voltage VG2 307 may be approximately twenty volts to enable and approximately minus five volts to disable; and the source voltage Vs 301 requirement may be approximately ten to fifteen volts.

Further, in an embodiment, a red display element may have a first set of sizes and characteristics for T1 302, T2 306, T3 308, diode 304, Rs 316, and Cs 318; a blue display element may have a second set of sizes and characteristics for T1 302, T2 306, T3 308, diode 304, Rs 316, and Cs 318; and a green display element may have a third set of sizes and characteristics for T1 302, T2 306, T3 308, diode 304, Rs 316, and Cs 318.

FIG. 4 is an illustration showing a screen assembly 400 with an arrangement of display elements and associated screen controls 404, in accordance with an exemplary embodiment. Screen assembly 400 comprises a region 402 having plurality of repeating groups 414 that define a pixel matrix; each repeating group 414 comprises: one red display element 420; one blue display element 418; and one green display element 416. Pads for the screen controls 105 are shown confined to one area 404, specifically, edge 412 of screen assembly 400. The Vs's (used in the embodiment shown as color select lines of red, blue, and green) of each individual display element are interconnected and routed out to three respective global interconnect pads. Vdd is a global power supply for all display elements. Similarly, GND and the gate selects VG1 and VG2 are independently connected to each display element and coupled to a respective interconnect pad at the edge 412 of the screen assembly 400 as shown.

The pixel matrix (or, matrix of display elements) responds to a pixel matrix generated by the image source 102 and projected in optical signal 107. A one-to-one pixel correspondence may be used between the two pixel matrix configurations, but this is not required. Spatial frequency band-limiting of optical signal 107 and related techniques may optionally be used to prevent artifacts such as Moiré or aliasing between the two pixel matrix configurations. In the embodiment, the optical signal 107 comprises pixel matrix information that includes red pixel data, blue pixel data, and green pixel data (pixel data generally corresponds to wavelength bands of light to be generated and output to the screen assembly 400). Pixel data is synchronized with the screen controls 105.

For the embodiment utilizing multiple Vs (source voltage) lines as color select lines, each color select Vs of the screen controls 105 is selected from the set comprising: a red color select VsR, a blue color select VsB, and a green color select VsG (separate color select voltage signals are described in more detail in connection with FIG. 5). Accordingly, in the exemplary embodiment, a red color select VsR is coupled to the source of T1 302 in a red display element 420, a blue color select VsB is coupled to the source of T1 302 in a blue display element 418, and a green color select VsG is coupled to the source of T1 302 in a green display element 416.

Confining the interconnect pads for screen controls 105 to only one area, specifically, edge 412, allows cutting of the remaining area (area within screen assembly 400 without interconnect pads for screen controls 105) into various irregular and/or non-rectangular shapes, as indicated by left side 406, top 408, and right side 410. In addition, screen assembly 400 may be bent or curved. The edge 412 having screen controls may additionally be used to mount screen assembly 400 to a console or cockpit structure. While sides 406, 408 and 410 are depicted as avoiding display elements 416, 418 and 420, this is not a limitation provided care is taken to avoid short circuits between the associated screen controls 105, such as via suitable cutting methods, laser trimming, or other means.

The screen assembly 400 may be made of glass or flexible plastic that has a barrier layer compatible with the features of the display elements, particularly the diode 304. For embodiments using OLED devices, an OLED layer may be sealed from the outside environment using a glass substrate or with a barrier coated plastic substrate with a full face lamination, as opposed to an edge sealing lamination. A full face lamination further supports cutting screen assembly 106 into arbitrary and irregular shapes without concern for exposing an OLED device to a degrading environment of oxygen and moisture.

Figure 5:
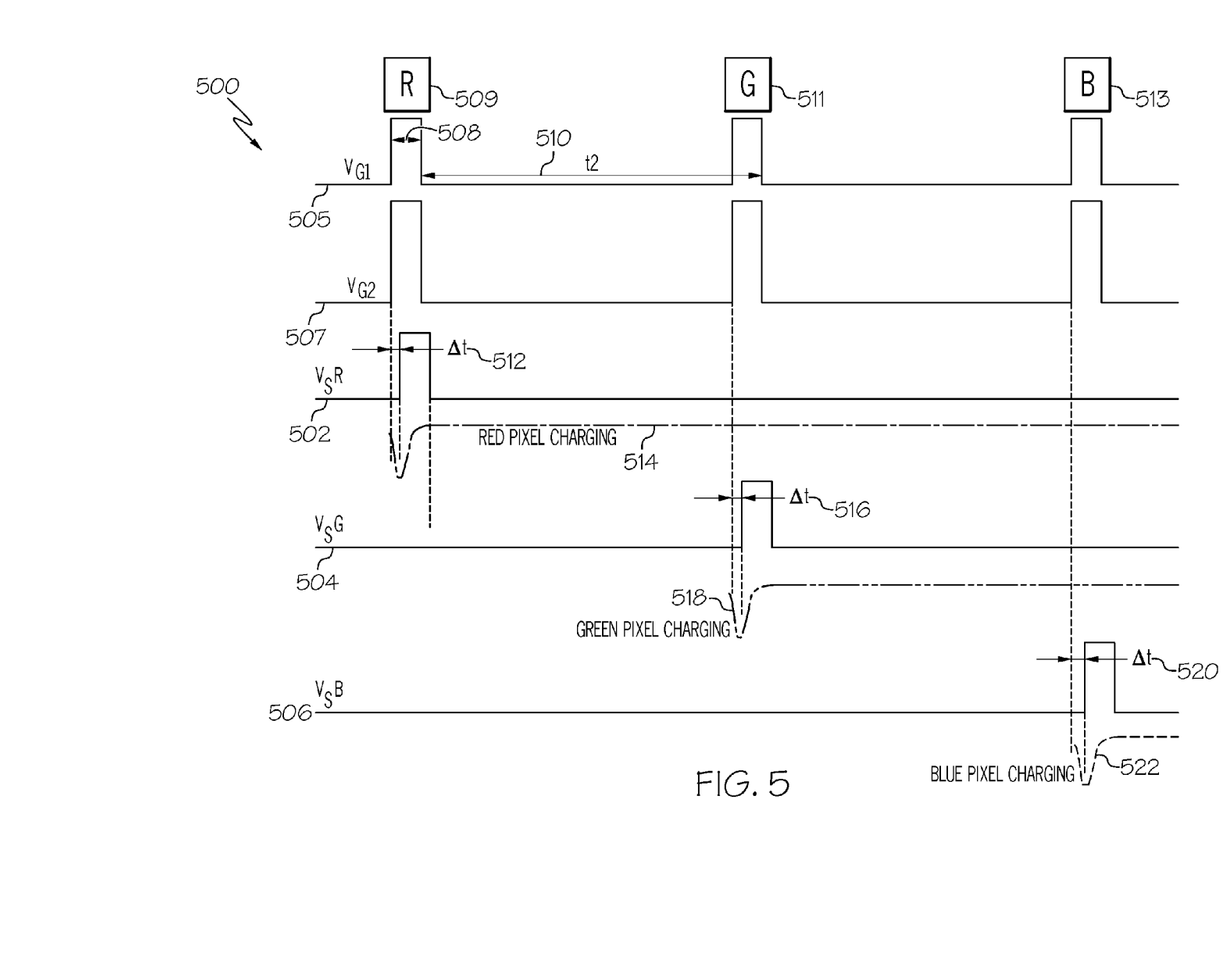
FIG. 5 is a simplified timing diagram depicting a color sequential pixel drive scheme, in accordance with an exemplary embodiment.

FIG. 5 is a simplified timing diagram 500 depicting a color sequential pixel drive scheme, in accordance with an exemplary embodiment utilizing multiple source voltage (Vs) lines as color select lines. As an overview, the controller 104 sequentially controls gate select voltages VG1 505 and VG2 507, and one color select voltage Vs. For example, red 509 is asserted when VG1 505, VG2 507, and VsR 502 are each at their respective "high" voltages. Similarly, green 511 is asserted when VG1 505, VG2 507, and VsG 504 are each at their respective "high" voltages and blue 513 is asserted when VG1 505, VG2 507 and VsB 506 are each at their respective "high" voltages. Notably, in each case, the color select voltage is delayed by a time interval, delta-t 512, delta-t 516, and delta-t 520, respectively, to assure that any previous information driven/written at a respective pixel (display element 300) is discharged prior to writing the present information (wherein "writing the information" means supplying a desired current to charge the gate of T3 308 to a level which drives OLED diode 304 to a pixel luminance requirement). Depending upon the characteristics of T1 302, it may be necessary to provide incident light to discharge display element 300. In an embodiment, optical signal 107 includes short intervals of light synchronized with the delta-t's 512, 516 and 520. These optical signals may be configured to only reach the T1 302 transistors for the corresponding color, or may be configured to illuminate all T1 302 transistors simultaneously.

As described herein, red, blue, and green wavelengths of light are emitted by one or more components of a red, blue, and green display element, respectively. As previously mentioned, the image source 102 is configured to generate an optical signal 107 that is synchronized with the pixel drive scheme such that optical signal 107 is appropriately timed to activate a respective photo transistor T1 302 when required to charge a respective color pixel. As shown in FIG. 5, in response to asserting VG1 505, VG2 507, and VsR 502 to write red 509, red pixels charge 514; in response to asserting VG1 505, VG2 507, and VsG 504 to write green 511, green pixels charge 518; and, in response to asserting VG1 505, VG2 507, and VsB 506 to write blue 513, blue pixels charge 522. In one embodiment, the optical signal 107 includes a single wavelength band to activate each photo transistor T1 302.

In another exemplary embodiment, multiple VG1 lines are used as color select lines for display elements 300. The operation will be similar to that shown in FIG. 5, except that there will be multiple VG1 traces, each with pulses for its corresponding color, and there will be a single Vs line shared by all constituent colors. In another embodiment, the Vs signal level may vary depending upon the constituent color being activated at that time by the corresponding color select VG1 line. In a similar embodiment, multiple VG2 lines are used as color select lines, in conjunction with shared (single) VG1 and Vs lines.

The duration or duty cycle of the signal pulses in screen controls 105 can be adjusted as needed. For example, in an embodiment, optical signal 107 can be substantially constant during the individual pulses of screen controls 105, such as in the case of an image source 102 which is capable of analog output control. In another embodiment, optical signal 107 can be temporally modulated during the screen control pulse, such as in the case of a DLP or scanned laser image source 102, such as are known in the art. In either case, the duration of the pulses can be appropriately set for effective integration for charging Cs 318.

In yet another embodiment, the characteristics of photo transistor T1 302 are modified by the inclusion of color selectivity in the photosensitive response, for example by covering the photosensitive region of each photo transistor T1 302 with a corresponding color filter (e.g., R, G, B). In this embodiment, each display element shares the same screen controls 105, and the color select signal is provided by multiple wavelength bands contained within optical signal 107.

Additional elements and/or control lines may be included for enhanced functionality, such as the inclusion of an additional transistor and control line to directly discharge Cs 318 in display element 300.

In traditional 60 Hertz projection display systems, the red pixels are written for one third of the frame time, the blue pixels are written for one third of the frame time, and the green pixels are written for one third of the frame time, or an approximately 33% duty cycle. Advantageously, the pixel drive scheme employed herein can allow the color pixels to approach a 100% duty cycle, thereby increasing brightness and efficiency. In addition, unlike display systems that "write" or activate a line in a screen assembly at a time, the exemplary embodiment allows for a remote image source 102 to activate, within screen assembly 400, all red display elements 420 at one time, all blue display elements 418 at one time, and all green display elements 416 at one time.

Thus, a hybrid projection display system that provides image quality superior to that of a traditional projection display system while flexibly supporting arbitrary screen sizes and non-planar screen surfaces similar to a rear projection display system is provided.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A display system, comprising:
a controller configured to receive an image signal and generate image data and screen controls therefrom, the screen controls comprising a source voltage (Vs), a first gate voltage (VG1), a second gate voltage (VG2), a power supply (Vdd), and a ground (GND);
an image source coupled to the controller and configured to (i) receive the image data (ii) generate an optical signal therefrom, and (iii) project the optical signal; and
a screen assembly (i) coupled to the controller, (ii) configured to receive the screen controls, and (iii) oriented to receive the optical signal, the screen assembly comprising a first display element that activates in response to receiving the optical signal, wherein the first display element comprises:
a first transistor (T1) comprising a gate, a drain and a source;
a second transistor (T2) comprising a gate, a drain and a source;
a third transistor (T3) comprising a gate, a drain, and a source;
a diode comprising a first terminal and a second terminal;
a resistor comprising a first terminal and a second terminal;
a capacitor comprising a first terminal and a second terminal; and
wherein the gate of T2 is coupled to VG1, the drain of T2 is coupled to the gate of T3 and to the first terminal of the capacitor, and the source of T2 is coupled to the drain of T1;
wherein the gate of T1 is coupled to VG2, the source of T1 is coupled to Vs, and the drain of T1 is coupled to the first terminal of the resistor;
wherein the drain of T3 is coupled to Vdd, and the source of T3 is coupled to the first terminal of the diode; and
wherein the second terminal of the resistor, the second terminal of the capacitor, and the second terminal of the diode are each coupled to GND.

2. The display system of claim 1, wherein T1 is a photo transistor.

3. The display system of claim 2, wherein the diode is an organic light emitting diode (OLED).

4. The display system of claim 3, wherein the capacitor is sized to charge the gate of T3 to a voltage sufficient to drive the OLED with a current corresponding to a desired pixel luminance.

5. The display system of claim 4, wherein T2 and T3 are conventional thin film transistors.

6. The display system of claim 5, further comprising multiple color select lines, wherein each color select line delivers a voltage from the set comprising source voltage Vs, first gate voltage VG1, and second gate voltage VG2.

7. The display system of claim 6, wherein the screen assembly comprises a plurality of display elements arranged within the screen assembly in repeating groups that define a pixel matrix.

8. The display system of claim 7, wherein the pixel matrix responds to a pixel matrix projected in the optical signal.

9. The display system of claim 8, wherein
each display element of the plurality of display elements is one of the set comprising: red display element, blue display element, and green display element; and
the first display element is one of the plurality of display elements.

10. The display system of claim 9, wherein the color select line is one from the set comprising a red source voltage VsR, a blue source voltage VsB, and a green source voltage VsG; and wherein each group of the repeating groups comprise: one red display element having a source of T1 coupled to VsR; one blue display element having a source of T1 coupled to VsB; and one green display element having a source of T1 coupled to VsG.

11. The display system of claim 10, wherein
the optical signal comprises red pixel data, blue pixel data, and green pixel data; and
red display elements activate in response to receiving the red pixel data, blue display elements activate in response to receiving the blue pixel data, and green display elements activate in response to receiving the green pixel data.

12. The display system of claim 1, wherein the controller is configured to receive the image signal input from a Video Graphics Array (VGA) or a Digital Video Interface (DVI).

13. A display system, comprising:
a controller configured to receive an image signal and generate image data and screen controls therefrom;
an image source coupled to the controller and configured to (i) receive the image data (ii) generate an optical signal comprising red pixel data, blue pixel data, and green pixel data therefrom, and (iii) project the optical signal; and
a screen assembly having a plurality of edges, the screen assembly
(i) coupled to the controller,
(ii) configured to receive the screen controls along one edge of the plurality of edges,
(iii) oriented to receive the optical signal, and
(iv) comprising a plurality of display elements, each display element of the plurality of display elements is one of the set comprising: red display elements that activate in response to receiving the red pixel data, blue display elements that activate in response to receiving the blue pixel data, and green display elements that activate in response to receiving the green pixel data; and
wherein the screen controls comprise a source voltage (Vs), a first gate voltage (VG1), a second gate voltage (VG2), a power supply (Vdd), and a ground (GND); and wherein each display element of the plurality of display elements further comprises:
a first transistor (T1) comprising a gate, a drain and a source;
a second transistor (T2) comprising a gate, a drain and a source;
a third transistor (T3) comprising a gate, a drain, and a source;
a diode comprising a first terminal and a second terminal;
a resistor comprising a first terminal and a second terminal;
a capacitor comprising a first terminal and a second terminal; and wherein the gate of T2 is coupled to VG1, the drain of T2 is coupled to the gate of T3 and to the first terminal of the capacitor, and the source of T2 is coupled to the drain of T1;

wherein the gate of T1 is coupled to VG2, the source of T1 is coupled to Vs, and the drain of T1 is coupled to the first terminal of the resistor;

wherein the drain of T3 is coupled to Vdd, and the source of T3 is coupled to the first terminal of the diode; and wherein the second terminal of the resistor, the second terminal of the capacitor, and the second terminal of the diode are each coupled to GND.

14. The display system of claim 13 wherein T1 is a photo transistor.

15. The display system of claim 14, wherein the diode is an organic light emitting diode (OLED).

16. The display system of claim 15, wherein the capacitor is sized to charge the gate of T3 to a voltage sufficient to drive the OLED with a current corresponding to a desired pixel luminance.

17. The display system of claim 16, wherein T2 and T3 are conventional thin film transistors.

* * * * *